United States Patent
Chaudhuri et al.

(10) Patent No.: US 10,172,026 B2
(45) Date of Patent: Jan. 1, 2019

(54) METHODS AND SYSTEMS FOR NEIGHBOR RELATION MANAGEMENT IN WIRELESS BROADBAND NETWORKS

(71) Applicant: WIPRO LIMITED, Bangalore (IN)

(72) Inventors: Saptarshi Chaudhuri, Bangalore (IN); Irfan Baig, Bangalore (IN)

(73) Assignee: Wipro Limited, Bangalore (IN)

(*) Notice: Subject to any disclaimer, the term of this patent is extended or adjusted under 35 U.S.C. 154(b) by 141 days.

(21) Appl. No.: 15/466,934

(22) Filed: Mar. 23, 2017

(65) Prior Publication Data

US 2018/0227781 A1 Aug. 9, 2018

(30) Foreign Application Priority Data

Feb. 8, 2017 (IN) .............................. 201741004637

(51) Int. Cl.
| | |
|---|---|
| H04W 24/10 | (2009.01) |
| H04W 72/08 | (2009.01) |
| H04L 12/26 | (2006.01) |
| H04W 24/02 | (2009.01) |
| H04W 88/08 | (2009.01) |

(Continued)

(52) U.S. Cl.
CPC .............. *H04W 24/10* (2013.01); *H04L 43/08* (2013.01); *H04W 24/02* (2013.01); *H04W 72/082* (2013.01); *H04W 36/0083* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | |
|---|---|---|
| 2012/0100884 A1 | 4/2012 | Radulescu et al. |
| 2012/0178451 A1 | 7/2012 | Kubota et al. |

(Continued)

FOREIGN PATENT DOCUMENTS

| | | |
|---|---|---|
| EP | 2 211 571 | 7/2010 |
| EP | 2 966 901 | 1/2016 |
| WO | WO 2012/135120 | 10/2012 |

OTHER PUBLICATIONS

Extended European Search Report issued in the European Patent Office in counterpart European Application No. 17178884.7, dated Dec. 21, 2017, 8 pages.
3GPP TS 36.300 V8.12.0 (Mar. 2010), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010, *3GPP*, pp. 149 pages.

(Continued)

*Primary Examiner* — Rebecca E Song
(74) *Attorney, Agent, or Firm* — Finnegan, Henderson, Farabow Garrett & Dunner LLP

(57) ABSTRACT

A method and system for neighbor relation management in wireless broadband networks is disclosed. The method includes dynamically selecting, by a Serving Base Station (SBS), a set of signal measurement reports from a plurality of signal measurement reports received within a predefined time interval. The method further includes sampling, by the SBS, signal level values of a plurality of configured Neighboring Base Stations (NBSs) and at least one new NBS, from the set of signal measurement reports, for a predefined sampling time period. The method includes computing, by the SBS, a retention factor for each of the plurality of configured NBSs and each of the at least one new NBS, in response to sampling the signal level values.

20 Claims, 7 Drawing Sheets

(51) Int. Cl.
*H04W 88/02* (2009.01)
*H04W 36/00* (2009.01)

(56) References Cited

U.S. PATENT DOCUMENTS

| | | | | |
|---|---|---|---|---|
| 2013/0130695 A1* | 5/2013 | Ryu | ................ | H04W 36/0083 455/438 |
| 2013/0295938 A1* | 11/2013 | Yamine | ............ | H04W 36/0083 455/436 |
| 2015/0181477 A1* | 6/2015 | Chaudhuri | ........ | H04W 36/0083 455/436 |
| 2016/0360438 A1 | 12/2016 | Yiu et al. | | |
| 2017/0055185 A1 | 2/2017 | Chaudhuri et al. | | |

OTHER PUBLICATIONS

3GPP TS 32.511 V8.2.0 (Jun. 2009), "3rd Generation Partnership Project; Technical Specification Group Services and System Aspects; Telecommunication management; Automatic Neighbour Relation (ANR) management; Concepts and requirements (Release 8)", Jun. 2009, *3GPP*, 12 pages.

3GPP TS 36.331 V8.12.0 (Dec. 2010), 3rd Generation Partnership Project; Technical Specification Group Radio Access Network; Evolved Universal Terrestrial Radio Access (E-UTRA); Radio Resource Control (RRC); Protocol specification ,(Release 8), Dec. 2010 76 pages.

* cited by examiner

METHODS AND SYSTEMS FOR NEIGHBOR RELATION MANAGEMENT IN WIRELESS BROADBAND NETWORKS

TECHNICAL FIELD

This disclosure relates generally to wireless broadband networks, and more particularly to methods and systems for neighbor relation management in wireless broadband networks.

BACKGROUND

Long Term Evolution (LTE) networks require seamless connectivity between User Equipments (UEs) and Evolved Node Base Stations (eNBs) irrespective of UE speed. This seamless connectivity is achieved via handover of active connection of a UE by a Serving BS (SBS) to an appropriate Neighbouring BS (NBS). The handover of a UE is network controlled and is initiated by the SBS with the help from the UE. The SBS decides on a target NBS to handover the UE based on the UE's reported measurement of coverage signal for various NBSs.

For a smooth handover to a target NBS, the SBS maintains neighbour relation information regarding the NBSs of the SBS. However, an outdated neighbour relation information may lead to severe call drops and performance degradation after a UE handover. Thus, for a successful UE handover, in conventional systems, the SBS maintains a Neighbour Relation Table (NRT) that includes a list of NBSs for the SBS. However, as these conventional systems do not add NBS in the NRT based on their suitability for a handover, they end up including non-prospective NBSs in the NRT, while failing to include prospective NBSs, thereby resulting is an ineffective UE handover.

SUMMARY

In one embodiment, a method neighbor relation management in a wireless broadband network is disclosed. The method includes dynamically selecting, by a Serving Base Station (SBS), a set of signal measurement reports from a plurality of signal measurement reports received within a predefined time interval based on at least one of: a location of origin of each of the plurality of signal measurement reports, and variation of signal quality of each of the plurality of signal measurement reports with respect to an average signal quality associated with the plurality of signal measurement reports; sampling, by the SBS, signal level values of a plurality of configured Neighboring Base Stations (NBSs) and at least one new NBS, from the set of signal measurement reports, for a predefined sampling time period, wherein the signal level values of the at least one new NBS are greater than a predefined threshold for the predefined sampling time period, and wherein the set of signal measurement reports comprises signal measurement reports corresponding to the plurality of configured NBSs and the at least one new NBS; and computing, by the SBS, a retention factor for each of the plurality of configured NBSs and each of the at least one new NBS, in response to sampling the signal level values.

In another embodiment, an SBS for neighbor relation management in a wireless broadband network is disclosed. The SBS includes a processor and a memory communicatively coupled to the processor, wherein the memory stores processor instructions, which, on execution, causes the processor to dynamically select a set of signal measurement reports from a plurality of signal measurement reports received within a predefined time interval based on at least one of: a location of origin of each of the plurality of signal measurement reports, and variation of signal quality of each of the plurality of signal measurement reports with respect to an average signal quality associated with the plurality of signal measurement reports; sample signal level values of a plurality of configured NBSs and at least one new NBS, from the set of signal measurement reports, for a predefined sampling time period, wherein the signal level values of the at least one new NBS are greater than a predefined threshold for the predefined sampling time period, and wherein the set of signal measurement reports comprises signal measurement reports corresponding to the plurality of configured NBSs and the at least one new NBS; and compute a retention factor for each of the plurality of configured NBSs and each of the at least one new NBS, in response to sampling the signal level values.

In yet another embodiment, a non-transitory computer-readable storage medium having stored thereon, a set of computer-executable instructions for causing a computer comprising one or more processors to perform steps comprising: dynamically selecting, by an SBS, a set of signal measurement reports from a plurality of signal measurement reports received within a predefined time interval based on at least one of: a location of origin of each of the plurality of signal measurement reports, and variation of signal quality of each of the plurality of signal measurement reports with respect to an average signal quality associated with the plurality of signal measurement reports; sampling, by the SBS, signal level values of a plurality of configured NBSs and at least one new NBS, from the set of signal measurement reports, for a predefined sampling time period, wherein the signal level values of the at least one new NBS are greater than a predefined threshold for the predefined sampling time period, and wherein the set of signal measurement reports comprises signal measurement reports corresponding to the plurality of configured NBSs and the at least one new NBS; and computing, by the SBS, a retention factor for each of the plurality of configured NBSs and each of the at least one new NBS, in response to sampling the signal level values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
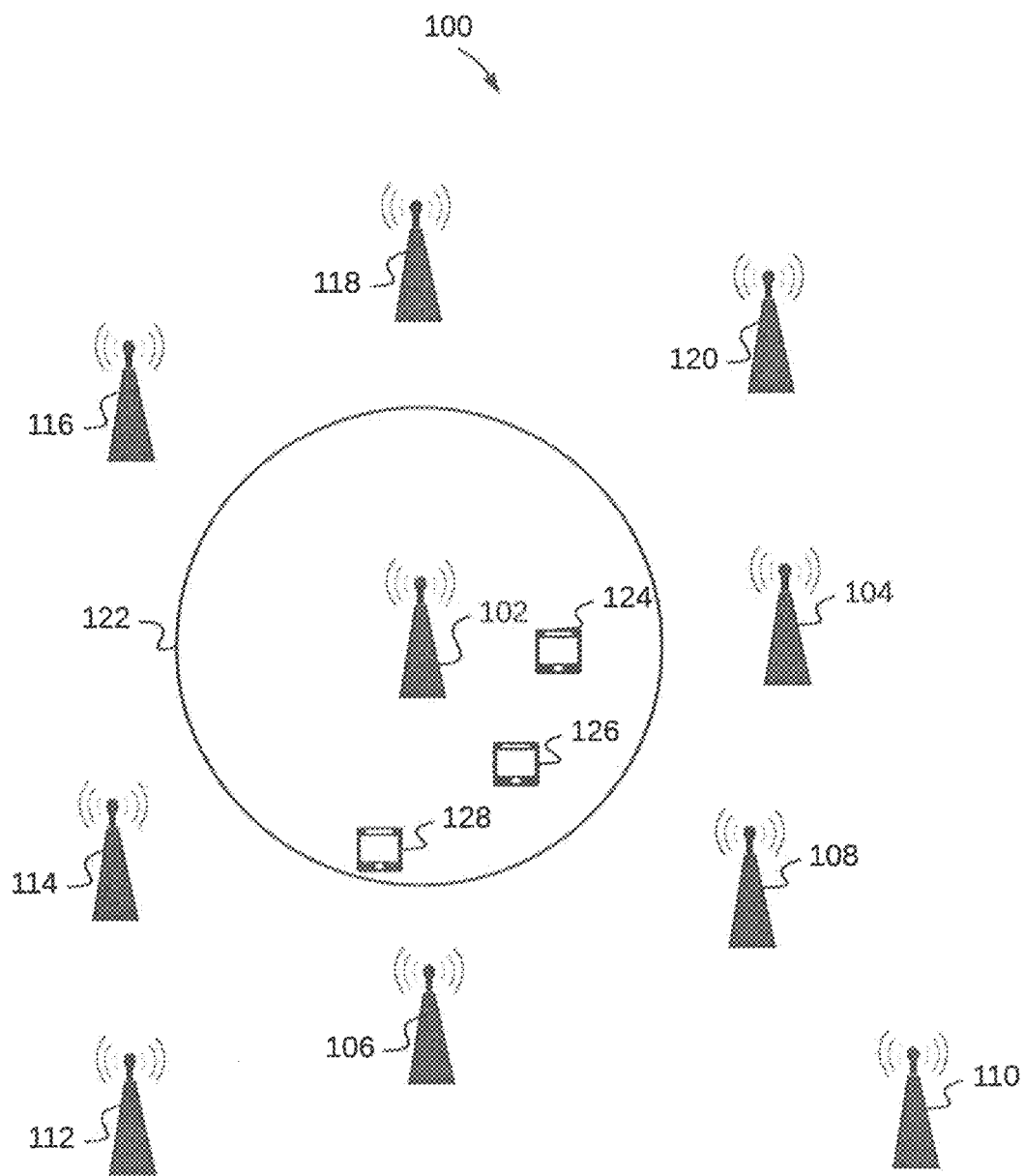
FIG. 1 illustrates a wireless broadband network in which various embodiments may function.

Additional illustrative embodiments are listed below. In one embodiment, an exemplary wireless broadband network 100 in which various embodiments may function is illustrated in FIG. 1. Wireless broadband network 100 may be a Long Term Evolution (LTE) network that includes an Evolved Node Base station (eNB) 102, an eNB 104, an eNB 106, an eNB 108, an eNB 110, an eNB 112, an eNB 114, an eNB 116, an eNB 118, and an eNB 120. It will be apparent to a person skilled in the art that the number of eNBs in wireless broadband network 100 is not limited to those depicted in FIG. 1. One of the eNBs acts as a Serving Base Station (SBS) for one or more User Equipments (UEs) and other eNBs act as Neighboring Base Stations (NBSs) to the SBS. In wireless broadband network 100, eNB 102 is the SBS and each of eNBs 104-120 act as NBSs. eNB 102 has a coverage area 122 and communicates wirelessly with a UE 124, a UE 126, and a UE 128 that are associated with eNB 102. It will be apparent to a person skilled in the art that the number of UEs associated with eNB 102 is not limited to those depicted in FIG. 1. Examples of a UE may include but are not limited to a cell phone, a smart phone, a tablet, a phablet, and a laptop.

With regard to the NBSs, each of eNBs 104-120 has a coverage area within which they communicate with UEs that are associated with them. These coverage areas and UEs have not been depicted in FIG. 1 for ease of explanation. eNBs 102-120 collectively form the evolved UMTS Terrestrial Radio Access Network (E-UTRAN) for wireless broadband network 100.

Each of eNBs 102-120 wirelessly communicate with a respective Mobility Management Entity (MME) or a Serving Gateway (S-GW) using an S1 interface. Each MME or S-GW further communicate with a Packet Data Network Gateway (PDN-GW) through an S5 interface, which connects wireless broadband network 100 with the Internet through an SGi link. Each of MME, S-GW, or PDN-GW are not shown in FIG. 1.

It will be apparent to a person skilled in the art that wireless broadband network 100 is not limited to an LTE network and may include but is not limited to Worldwide Interoperability for Microwave Access (WiMAX), Code Division Multiple Access (CDMA), Enhanced Data rates for GSM Evolution (EDGE), High Speed Packet Access (HSPA), GSM EDGE Radio Access Network (GERAN), a UMTS Terrestrial Radio Access Network (UTRAN), an Evolved-UTRAN (E-UTRAN), and an improved E-UTRAN. It will be further apparent to a person skilled in the art that for a wireless communication network other than LTE, network components and parameters associated with that wireless communication network will be used. Also, the description below describes an LTE network for purposes of example, and LTE terminologies are used in much of the description below. However, as stated above the techniques are applicable beyond LTE networks.

Figure 2:
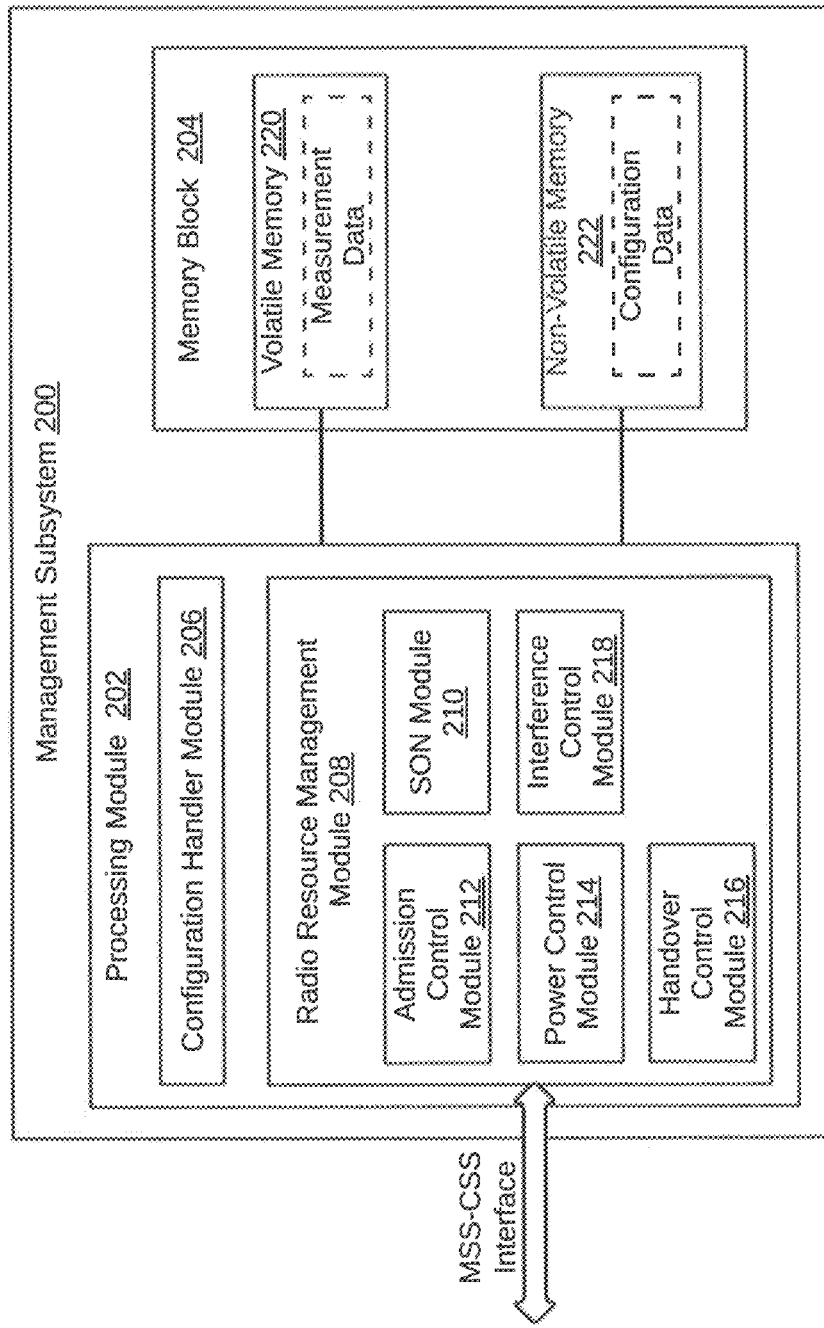
FIG. 2 is a block diagram illustrating communication of various components of a management subsystem in an Evolved Node Base Station (eNB), in accordance with an embodiment.

Referring now to FIG. 2, a block diagram for communication amongst various components of a management subsystem 200 in an eNB is illustrated, in accordance with an embodiment. Management subsystem 200 is responsible for system level management of co-channel interference, radio resources, and other radio transmission characteristics in the eNB. Management subsystem 200 includes a processing module 202 and a memory block 204.

Processing module 202 may be a single processor with multiple partitions or independent processors working in a group to perform the desired functionalities. To this end, processing module 202 includes a configuration handler module 206 and a radio resource management module 208. Configuration handler module 206 handles overall configuration of the eNB and performs various functions that may include, but are not limited to, receiving configuration data from an Operation and Maintenance (OAM) module (not shown in FIG. 2) through an OAM interface and storing them in memory block 204 at start up, bringing up the control subsystem, the data subsystem, the radio subsystem (not shown in FIG. 2) and configuring them using the configuration data. Configuration handler module 206 may also receive reconfiguration data from the OAM module to reconfigure the control subsystem, the data subsystem, and the radio subsystem. Additionally, the configuration handler module 206 updates feedback, via the OAM interface, to the OAM module to enable it to perform any change in the configuration data.

Radio resource management module 208 takes management decision to efficiently run the eNB and interfaces with the OAM module through configuration handler module 206. Additionally, the radio resource management module 208 interfaces with the control subsystem via an MSS-CSS interface. The MSS-CSS interface is used between management subsystem 200 and the control subsystem to send control instruction and configuration data to the control subsystem and to receive system level measurement data from the control subsystem. In the claimed invention, the MSS-CSS interface is additionally used to carry performance parameters, for example, traffic load at NBSs, interference level at NBSs, and handover failure rate associated with NBSs. These performance parameters are in addition to the performance parameters that the MSS-CSS interface is used to carry in compliance with the standard.

Radio resource management module 208 performs various functions through a Self-Organized Network (SON) module 210, an admission control module 212, a power control module 214, a handover control module 216, and an interference control module 218. SON module 210 performs various functions to (re)organize the eNB in a dynamically changing network topology. The decision to (re)organize is taken based on the configuration data and measurement data stored in memory block 204. These functions may include, but are not limited to Physical Cell Identity (PCI) self-configuration and self-optimization, Automatic Neighbor Relation (ANR) management, X2 link auto creation, cell outage detection, cell coverage optimization, and collecting live measurement metrics to send feedback to the OAM module about current network conditions. SON module 210 preforms additional functionalities that are further explained in conjunction with FIG. 3.

Admission control module 212 analyzes the current network load and UE capability to allow the UE connectivity into the wireless broadband network. Power control module 214 analyzes different network condition to decide on the transmission power that has to be used by the eNB and handover control module 216 analyzes measurement data for different NBSs to decide on a target NBS for handover of a UE. To reduce interference from various NBSs, interference control module 218 analyzes the measurement data for different NBSs and reconfigures the eNB.

To store the measurement data, configuration data, and performance parameters, memory block 204 includes a volatile memory 220 and a non-volatile memory 222. Volatile Memory 220 stores system level measurement data provided by the control subsystem. The system level measurement data includes different measurement metrics collected from UEs and calculated by the control subsystem, the data subsystem, and the radio subsystem. Thus data is used by radio resource management module 208 to monitor the prevalent radio network condition in order to take radio network management decisions.

Non-volatile memory 222 stores configuration data received from the OAM module. Processing module 202 accesses this data from non-volatile memory 222 to configure the control subsystem, the data subsystem, and the radio subsystem through the MSS-CSS interface. The configuration data is also used for configuration, updating existing configuration, and instantiation of the eNB. A portion of non-volatile memory 222 may persist across system-start-up cycles.

Figure 3:
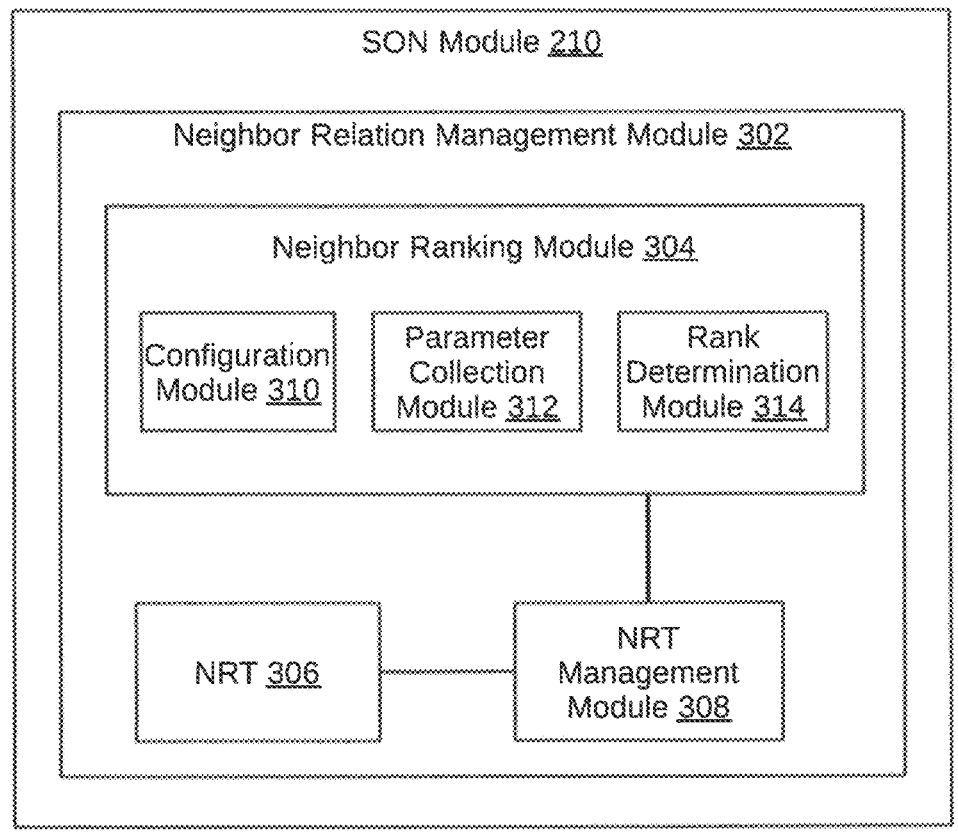
FIG. 3 illustrates a block diagram depicting various modules of a Self Organized Network (SON) module within the management subsystem, in accordance with an embodiment.

Referring now to FIG. 3, a block diagram depicting various modules of SON module 210 within management subsystem 200 is illustrated, in accordance with an embodiment. In addition to other modules (not shown in FIG. 3) required by the standard, SON module 210 includes a neighbor relation management module 302 that further includes a neighbor ranking module 304, a Neighbor Relation Table (NRT) 306 that includes a list of NBSs, and a NRT management module 308 that updates or modifies NRT 306 and extracts information related to NBSs.

Neighbor ranking module 304 stores configuration data that is required by other modules within SON module 210. Neighbor ranking module 304 also receives a plurality of signal measurement reports from a plurality of UEs and determines ranks for the NBSs for which the plurality of signal measurement reports are received. To this end, neighbor ranking module 304 further includes a configuration module 310, a parameter collection module 312, and a rank determination module 314.

Configuration module 310 stores the configuration data that it receives from configuration handler module 206. The configuration data includes, but is not limited to maximum number of NBS entries in NRT 306, i.e., M, default NBSs list (for example, <NBR1, NBR2, NBR3 ... NBRm>, where m≤M, a predefined sampling time period to sample signal for NBSs (which may be represented as: $\tau_{sample}$), a threshold for the predefined sampling time period (which may be represented as: $\delta_{INFLECTION\_TB}$), gradient threshold for signal level time gradient (which may be represented as: $\sigma_{th}$), and a threshold for retention factor computed for an NBS. The computation of retention factor for an NBS is explained in detail in conjunction with FIG. 4. This configuration data is used by parameter collection module 312, rank determination module 314, and NRT management module 308.

Parameter collection module 312 receives signal measurement reports and performance indicators for the NBSs from configuration module 310 and subsequently stores them. The performance indicators include, but are not limited to, an inactivity timer ($\gamma$), a traffic load at the neighbor ($\upsilon$), an interference level ($\chi$), and a Handover failure rate ($\omega$). Further, the aforementioned performance indicators may be used to determine the retention factor. A signal measurement report received from a UE includes, but is not limited to, one or more of measured signal level value between the UE and the SBS, measured signal level values between the UE and NBSs configured with the SBS, measured signal level values between the UE and newly detected NBSs.

Based on the signal measurement reports, the configuration data, and performance indicators, rank determination module 314 computes a retention factor for a plurality of configured NBSs and one or more new NBSs. Thereafter, rank determination module 314, via NRT management module 308, updates NRT 306 with newly detected NBSs and retention factors for each NBSs in NRT 306. The computation of retention factor for an NBS is explained in detail in conjunction with FIG. 4. Thereafter, rank determination module 314 ranks NBSs listed in NRT 306 based on values of retention factors. Based on these rankings, NRT management module 308 removes one or more NBSs from NRT 306, when NRT 306 is full. Handover control module 216 uses these rankings updated in NRT 306 to decide which NBS should be used to handover a UE. This is further explained in detail in conjunction with FIGS. 4, 5A, and 5B.

As a result, the system discussed above enable a time based assessment of the measured signal levels of NBSs, such that, only prospective NBSs are added to the NRT. As there is an upper number limit for adding NBSs in the NRT, the effective management of the NRT by removal of least prospective NBSs, when the NRT is full, leads to preemption of NBSs. Moreover, as prospective NBSs in the NRT are ordered based on their suitability ranking for a handover, issues of unsuccessful handovers and call drops for UEs are resolved.

Figure 4:
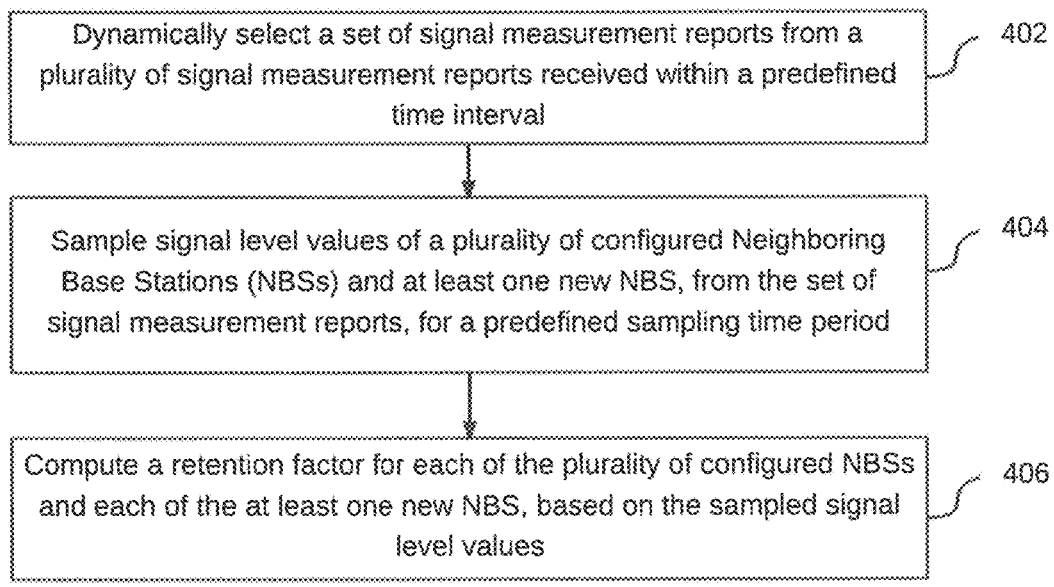
FIG. 4 illustrates a flowchart of a method for neighbor relation management in a wireless broadband network, in accordance with an embodiment.

Referring now to FIG. 4, a flowchart of a method for neighbor relation management in a wireless broadband network is illustrated, in accordance with an embodiment. In the wireless broadband network, the SBS receives a plurality of signal measurement reports from a plurality of UEs that are associated with the SBS. These plurality of signal measurement reports may be sent periodically by associated UEs to the SBS after a predefined time interval or in response to a request from the SBS. The plurality of signal measurement reports are associated with a plurality of NBSs of the SBS. By way of an example, eNB 102 receives signal measurement reports from each of UE 124, UE 126, and UE 128. These signal measurement reports are associated with one or more of eNBs 104-120. Based on their respective locations, UE 124 may send signal measurement reports associated with eNB 104, UE 126 may send signal measurement reports associated with each of eNB 104, eNB 106, and eNB 108, and UE 128 may send signal measurement reports associated with eNB 106 and eNB 108. A signal measurement report received for an NBS includes details associated with quality of signal received from the NBS. The quality of signal may, for example, be measured using parameter that may include, but are not limited to Reference Signal Received Power (RSRP), Signal to Noise Ratio (SNR), Received Signal Strength Indicator (RSSI), Channel Quality Indicator (CQI), and Reference Signal Received Quality (RSRQ).

The plurality of signal measurement reports are received for NBSs that are already configured with the SBSs, i.e., configured NBSs, and for NBSs that are not already configured with the SBS, i.e., new NBSs. A Neighbor Relation Table (NRT) at the SBS would already include one or more configured NBSs, based on a maximum number of NBSs defined for the NRT (for example, 32 NBSs). The NRT, at this time, may not include new NBSs, which may be later added to the NRT as elaborated further. By way of an example, an NRT for eNB 102 may be represented by table 1 given below, when the already configured NBSs for eNB 102 include eNBs 104-112. eNBs 114-120 are new NBSs which are not yet configured with eNB 102 and thus not included in the NRT.

TABLE 1

| S. No | NBS Details |
|---|---|
| 1 | eNB 104 |
| 2 | eNB 106 |
| 3 | eNB 108 |
| 4 | eNB 110 |
| 5 | eNB 112 |

The SBS, at step 402, dynamically selects from the plurality of signal measurement reports, a set of signal measurement reports that were received within a predefined time interval. The predefined time interval for selecting the set of signal measurement reports may be defined by an administrator and may be reconfigured based on handover performance for increased efficiency of UE handover. A signal measurement report in the set may be selected based on a location of origin of the signal measurement reports, i.e., location of the UE sending the signal measurement report. Additionally, for selecting the signal measurement report, variation of signal quality of the signal measurement report with respect to an average signal quality associated with the plurality of signal measurement reports is also considered. In other words, the signal measurement report is included in the set by the SBS, when the signal quality associated with the signal measurement report is greater than the average signal quality computed for the plurality of signal measurement reports. This is further explained in conjunction with FIGS. 5A and 5B.

At step 404, using the set of signal measurement reports, the SBS, samples signal level values of a plurality of configured NBSs for a predefined sampling time period. The predefined sampling time period may be represented as $\tau_{Sample}$. The SBS, at step 404, also samples signal level values for one or more new NBSs that have signal level values greater than a predefined threshold for the predefined sampling time period. The predefined threshold may be represented as $\delta_{INFLECTION\_TH}$. The set of signal measurement reports includes signal measurement reports for the plurality of configured NBSs and the one or more new NBSs. In other words, NBSs for which the set of signal measurement reports were received, include the plurality of configured NBSs and the one or more new NBSs.

After sampling the signal values for the predefined sampling time period, a signal level time gradient is determined for each of the plurality of configured NBSs and the one or more new NBSs using a regression technique. A signal level time gradient for an NBS is determined based on a relationship modelled by the SBS between measured signal level value for the NBS and a time period required to measure that signal level value. This is further explained in detail in conjunction with FIGS. 5A and 5B.

In response to sampling the signal level values, the SBS, at step 406 computes a retention factor for each of the plurality of configured NBSs and each of the one or more new NBSs. The retention factor for an NBS may be computed based on a signal level time gradient for the NBS. The retention factor is also computed based on inactivity time associated with the NBS, which is the time period during which no measured signal level is reported by any UE for that NBS. Additionally, the retention factor is computed using handover failure rate experienced by the NBS, traffic load at the NBS, and interference level at the NBS, which may be computed as the average level of downlink interference experienced from the NBS by one or more UEs.

In an exemplary embodiment, a retention factor for an NBS may be computed using the equation (1) given below:

$$RF = \sigma + \left(\frac{1}{\gamma + \upsilon + \chi}\right)^{1/\omega} \quad (1)$$

where,
RF is the retention factor for the NBS,
σ is the signal level time gradient for the NBS,
γ is the inactivity timer associated with the NBS,
υ is the traffic load at the NBS, and may be communicated directly by the NBS to the SBS through an X2 link,
χ is the interference level at the NBS, and
ω is the handover failure rate of the NBS.

In addition to computing retention factors for each of the plurality of configured NBSs and the one or more new NBSs, the SBS also computes retention factors for each NBS that is included in the NRT. In an embodiment, the NBSs present in the NRT may be same as the plurality of configured NBSs. In this case, by computing retention factors for the plurality of configured NBSs, the SBS also exhausts NBSs in the NRT. In another embodiment, the plurality of configured NBSs may be a subset of the NBSs included in the NRT. In this case, after computing retention factors for the plurality of configured NBSs, the SBS computes retention factors for NBSs in the NRT that were not included in the plurality of configured NBSs. This is further explained in detail in conjunction with FIGS. 5A and 5B.

Based on the retention factors computed for the NBSs in the NRT, the SBS ranks each of the NBSs in the NRT, such that, the NBS that has the highest retention factor in the NRT is assigned the highest rank and the NBS that has the lowest retention factor in the NRT is assigned the lowest rank. Based on ranking of the NBSs in the NRT, the SBS determines a relative rank for one or more NBSs that are not already present in the NRT. The one or more NBSs, for which the relative rank is determined, may be same as the one or more new NBSs.

By way of an example, referring back to the NRT of table 1, when ranks have been determined for each of eNBs 104-112, relative ranks are determined for the new NBSs, i.e., eNBs 114-120, based on the ranks assigned to each of eNBs 104-112. In an embodiment, the one or more NBSs, for which the relative rank is determined, are a subset of the plurality of configured NBSs. The one or more NBSs are temporarily updated to the NRT based on their relative ranking. The NRT may be pruned later in order to keep the total number of NBSs in conformance with the maximum number of NBSs allowed to be retained in the NRT. The rankings, thus assigned by the SBS are used to perform handover of one or more of the plurality of UEs associated with the SBS to one or more NBSs included in the NRT. This is further explained in detail in conjunction with FIGS. 5A and 5B.

Figure 5A:
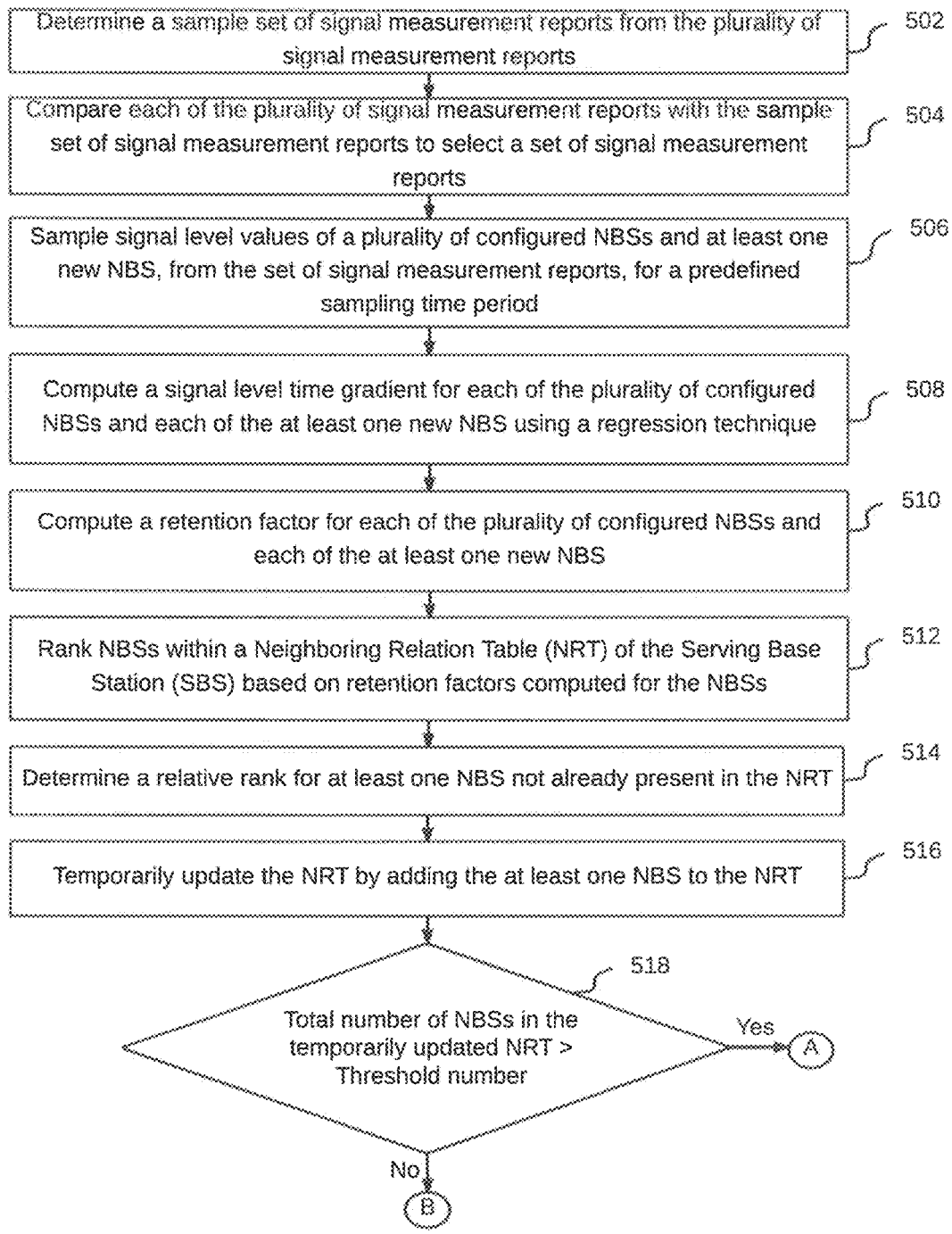
FIGS. 5A and 5B illustrates a flowchart of a method for performing User Equipment (UE) handover in a wireless broadband network based on neighbor relation management, in accordance with an embodiment.
Figure 5B:
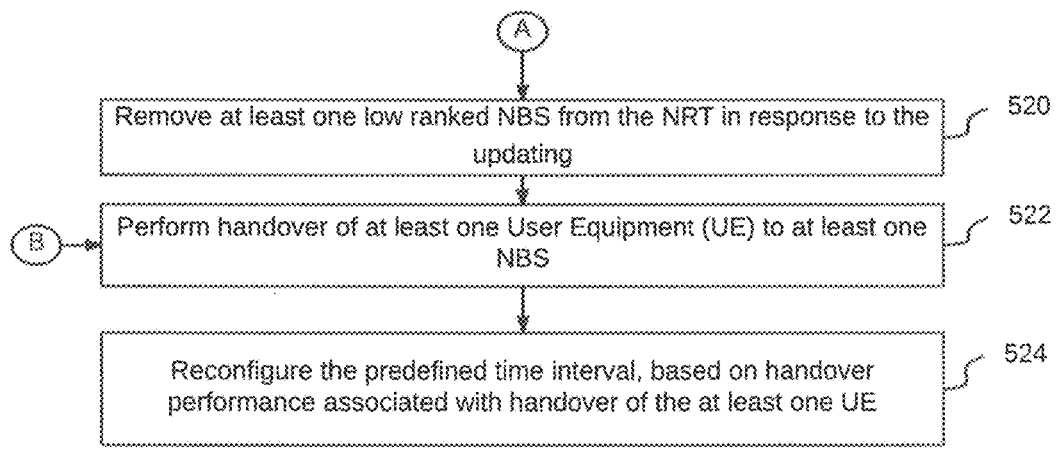

Referring now to FIGS. 5A and 5B, a flowchart of a method for performing UE handover in a wireless broadband network based on neighbor relation management is illustrated, in accordance with an embodiment. After the plurality of signal measurement reports have been received by the SBS from the plurality of UEs associated with the SBS, the SBS, at step 502, determines a sample set of signal measurement reports within a predefined time interval from the plurality of signal measurement reports. The sample set is determined based on the average of signal quality associated with the plurality of signal measurement reports. In other words, only those signal measurement reports are included in the sample set, for which the signal quality measured within the predefined time interval is greater than the average of signal quality associated with the plurality of signal measurement reports.

Thereafter, the SBS, at step 504, compares each of the plurality of signal measurement reports with the sample set of signal measurement reports based on location of origin (i.e., location of UEs sending these reports) and variation of signal quality from average signal quality associated with the sample set, to select a set of signal measurement reports. In other words, the signal quality for each signal measurement report in the set is greater than the average of signal quality associated with the sample set.

Once the set of signal measurement reports has been selected, the SBS, at step 506, samples signal level values of a plurality of configured NBSs and one or more NBSs from the set of signal measurement reports for a predefined sampling time period. The predefined sampling time period may be represented as $\tau_{sample}$. The SBS samples signal level values only for those new NBSs that have signal level values greater than a predefined threshold, for the predefined sampling time period. This has been explained in detail in conjunction with FIG. 4. At step 508, the SBS computes a signal level time gradient for each of the plurality of configured NBSs and each of the one or more NBSs using a regression technique. In an embodiment, a linear regression is used to determine a linear relationship of sampled signal level values versus time for each of the plurality of configured NBSs and each of the one or more NBSs. In an exemplary embodiment, the linear relation for an NBS may be represented using equation (2) given below:

$$y = m^* x + c \quad (2)$$

where,
y is the dependent variable, i.e., the sampled signal level value for the NBS,
x is the independent variable, i.e., time interval required to sample the signal level value,
m is the signal level time gradient of the measured signal level value for the NBS,
c is the constant error.

In the above the equation, m is the slope of the linear relationship and it depicts the rate at which signal level value changes with respect to time for the NBS. A positive signal level time gradient indicates that the signal level value changes at a positive rate, while a negative signal level time gradient indicates that the signal level value changes at a negative rate. Thereafter, at step 510, the SBS computes a retention factor for each of the plurality of configured NBSs and each of the one or more NBSs, based on one or more of an associated signal level time gradient, inactivity time, handover failure rate, traffic load at the NBS, and interference level. The SBS also computes retention factor for each NBS included in the NRT and updates the NRT with values of these retention factors. This has been explained in detail in conjunction with FIG. 4.

By way of an example, with reference to the NRT of table 1, eNB 102 may compute the retention factors for NBSs in the NRT as given in table 2 and the retention factors for other new NBSs as given in table 3.

TABLE 2

| eNB in the NRT | Retention Factor |
|---|---|
| eNB 104 | 0.85 |
| eNB 106 | 0.77 |
| eNB 108 | 0.43 |
| eNB 110 | 0.57 |
| eNB 112 | 0.31 |

TABLE 3

| New eNB | Retention Factor |
|---|---|
| eNB 114 | 0.87 |
| eNB 116 | 0.65 |
| eNB 118 | 0.30 |
| eNB 120 | 0.22 |

At step 512, the SBS ranks NBSs listed within its NRT based on retention factors computed for these NBSs. As discussed in FIG. 4, at this point, the NRT would only include NBSs that are already configured with the SBS. In continuation of the example above and referring back to the table 2, eNB 102 (SBS) assign ranks to each of eNBs 104-112 based on retention factors computed for them. This assignment of rank is depicted by table 4 given below:

TABLE 4

| eNB in the NRT | Retention Factor | Rank |
|---|---|---|
| eNB 104 | 0.85 | 1 |
| eNB 106 | 0.77 | 2 |
| eNB 108 | 0.43 | 4 |
| eNB 110 | 0.57 | 3 |
| eNB 112 | 0.31 | 5 |

At step 514, the SBS determines a relative rank for one or more NBSs not already present in the NRT. These one or more NBSs may be a part of the plurality of configured NBSs or the one or more new NBSs. In continuation of the example above, based on the retention factors as depicted in the table 3 and ranks assigned in the table 4, eNB 102 determines relative rank for eNBs 114-120 and modifies the rank assigned to NBSs in the NRT. This is depicted in table 5 given below:

TABLE 5

| eNB | Retention Factor | Rank |
|---|---|---|
| eNB 104 | 0.85 | 2 |
| eNB 106 | 0.77 | 3 |
| eNB 108 | 0.43 | 6 |
| eNB 110 | 0.57 | 5 |
| eNB 112 | 0.31 | 7 |
| eNB 114 | 0.87 | 1 |
| eNB 116 | 0.65 | 4 |
| eNB 118 | 0.30 | 8 |
| eNB 120 | 0.22 | 9 |

Thereafter, at step 516, the SBS temporarily updates the NRT by adding the one or more NBSs to the NRT, such that the signal level time gradient for each of the one or more NBSs is greater than a gradient threshold, i.e., $\sigma_{th}$. NBSs that are temporarily updated in the NRT may be marked with a potential NBS flag/tag. In continuation of the example above, signal level time gradient for each of the new NBSs, i.e., eNBs 114-120, is greater than the gradient threshold, thus the NRT of table 1 is updated to include eNBs 114-120. Once the NRT has been temporarily updated, the SBS performs a check, at step 518, to determine whether the total number of NBSs in the NRT is greater than a threshold number for the NRT. The maximum number of NBSs that can be included in an NRT, based on the standard, is 32, however, an administrator may set the threshold number to be lower than 32.

If the total number of NBSs in the NRT after being temporarily updated, is greater than the threshold number, SBS, at step 520, removes one or more low ranked NBSs from the NRT. In continuation of the example above, the threshold number of NBSs for the NRT may be fixed at 7. As the total number of NBSs in the NRT after being temporarily updated is 9, two NBSs that have lowest ranks are removed from the temporarily updated NRT. Referring back to table 5, as eNB 118 has $8^{th}$ rank and eNB 120 has $9^{th}$ rank, both these eNBs are removed from the temporarily updated NRT. As a result, the NRT is permanently updated.

Thereafter, at step 522, the SBS performs handover of one or more of the plurality of UEs to one or more NBSs selected from one of the plurality of configured NBSs or the one or more new NBSs that are included in the permanently updated NRT. These one or more NBSs are selected based on ranks assigned to NBSs in the NRT. In continuation of the example given above, as eNB 114 is assigned the $1^{st}$ rank in the NRT, handover of a UE from eNB 102 to eNB 114 is performed. Based on handover performance associated with handover of the one or more UEs, the SBS, at step 524, reconfigures the predefined time interval and the predefined sampling time period. Referring back to step 518, if the total number of NBSs in the NRT after being temporarily updated is less than or equal to the threshold number, the control moves to step 522.

As a result, the methods discussed above enable a time based assessment of the measured signal levels of NBSs, such that, only prospective NBSs are added to the NRT. As there is an upper number limit for adding NBSs in the NRT, the effective management of the NRT by removal of least prospective NBSs, when the NRT is full, leads to preemption of NBSs. Moreover, as prospective NBSs in the NRT are ordered based on their suitability ranking for a handover, issues of unsuccessful handovers and call drops for UEs are resolved.

Figure 6:
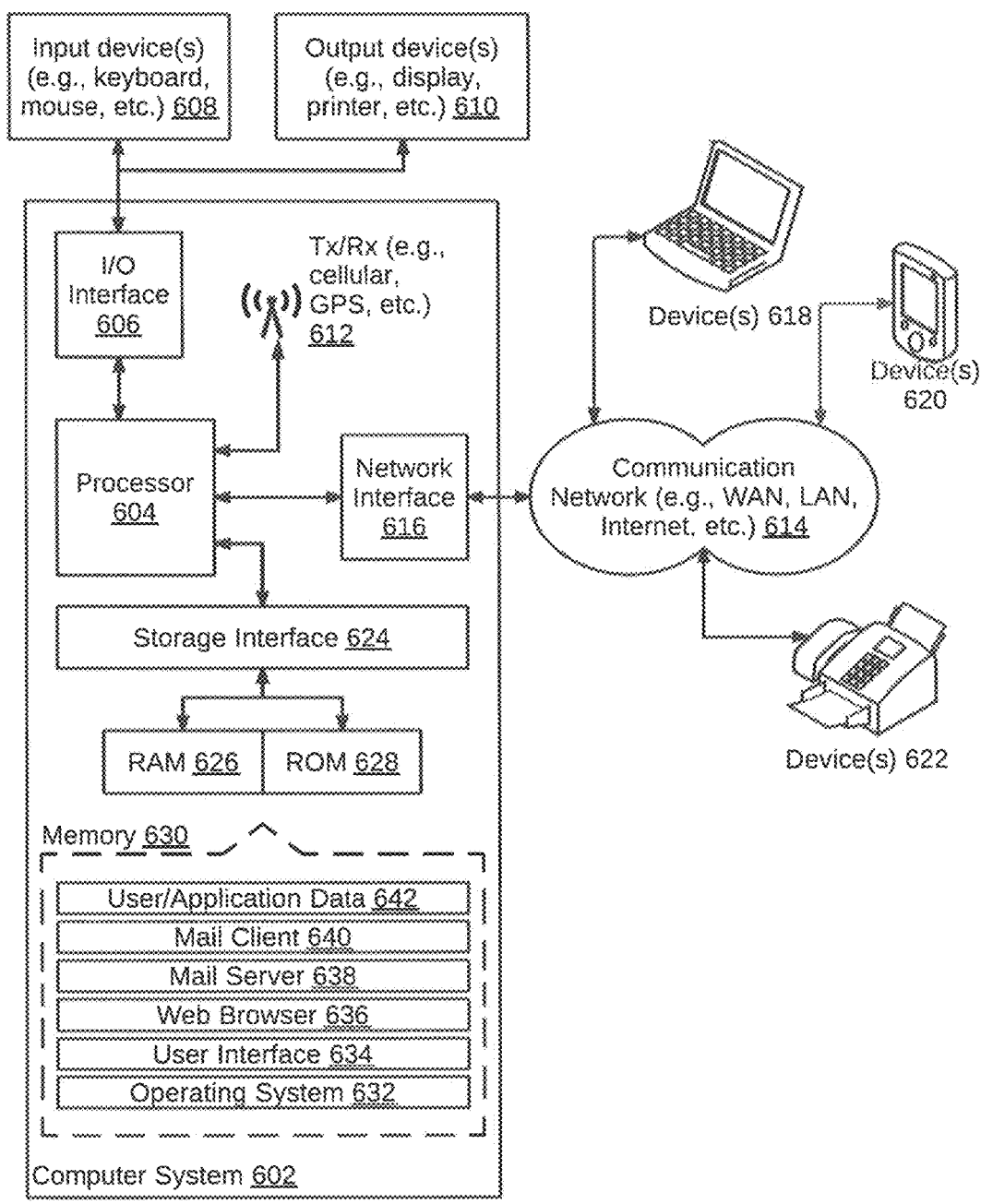
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624.

Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, a user interface 634, a web browser 636, a mail server 638, a mail client 640, a user/application data 642 (e.g., any data variables or data records discussed in this disclosure), etc. Operating system 632 may facilitate resource management and operation of the computer system 602. Examples of operating system 632 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 602 may implement web browser 636 stored program component. Web browser 636 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 602 may implement mail server 638 stored program component. Mail server 638 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement mail client 640 stored program component. Mail client 640 may be a mail viewing application, such as Apple Mail, Microsoft Entourage, Microsoft Outlook, Mozilla Thunderbird, etc.

In some embodiments, computer system 602 may store user/application data 642, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for neighbor relation management in wireless broadband networks. The method and system enable a time based assessment of the measured signal levels of NBSs, such that, only prospective NBSs are added to the NRT. As there is an upper number limit for adding NBSs in the NRT, the effectively management of the NRT by removal of least prospective NBSs, when the NRT is full, leads to preemption of NBSs. Moreover, as prospective NBSs in the NRT are ordered based on their suitability ranking for a handover, issues of unsuccessful handovers and call drops for UEs are resolved.

The specification has described methods and systems for neighbor relation management in wireless broadband networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A method of neighbor relation management in a wireless broadband network, the method comprising:
dynamically selecting, by a Serving Base Station (SBS), a set of signal measurement reports from a plurality of signal measurement reports received within a predefined time interval based on at least one of: a location of origin of each of the plurality of signal measurement reports, and variation of signal quality of each of the plurality of signal measurement reports with respect to an average signal quality associated with the plurality of signal measurement reports;
sampling, by the SBS, signal level values of a plurality of configured Neighboring Base Stations (NBSs) and at least one new NBS, from the set of signal measurement reports, for a predefined sampling time period, wherein the signal level values of the at least one new NBS are greater than a predefined threshold for the predefined sampling time period, and wherein the set of signal measurement reports comprises signal measurement reports corresponding to the plurality of configured NBSs and the at least one new NBS; and
computing, by the SBS, a retention factor for each of the plurality of configured NBSs and each of the at least one new NBS, in response to sampling the signal level values.

2. The method of claim 1, wherein dynamically selecting comprises:
determining a sample set of signal measurement reports from the plurality of signal measurement reports, within the predefined time interval based on the average of signal quality associated with the plurality of signal measurement reports, wherein the plurality of signal measurement reports are received from a plurality of User Equipments (UEs) associated with the SBS; and
comparing each of the plurality of signal measurement reports with the sample set of signal measurement reports based on associated location of origin and variation of signal quality from an average signal quality associated with the sample set to select the set of signal measurement reports.

3. The method of claim 1, further comprising computing a signal level time gradient for each of the plurality of configured NBSs and each of the at least one new NBS using a regression technique, wherein a signal level time gradient for a NBS is computed based on a signal level value associated with the NBS and a time period for measuring the signal level value.

4. The method of claim 1, further comprising ranking NBSs within a Neighboring Relation Table (NRT) of the SBS based on retention factors computed for the NBSs, wherein a NBS having the highest retention factor in the NRT is assigned the highest rank and a NBS having the lowest retention factor in the NRT is assigned the lowest rank.

5. The method of claim 4, further comprising determining a relative rank for at least one NBS not already present in the NRT, based on the ranking of the NBSs present in the NRT, wherein at least one of the plurality of configured NBSs and the at least one new NBS comprise the at least one NBS.

6. The method of claim 5, further comprising temporarily updating the NRT by adding the at least one NBS to the NRT based on an associated signal level time gradient being greater than a gradient threshold.

7. The method of claim 6, further comprising removing at least one low ranked NBS from the NRT in response to the updating, based on the ranking of the NBSs and a relative rank determined for each of the at least one NBS, when the total number of NBSs in the temporarily updated NRT is greater than a threshold number of BSs.

8. The method of claim 1, further comprising performing handover of at least one UE to at least one NBS selected from one of the plurality of configured NBSs or the at least one new NBS, based on an associated retention factor.

9. The method of claim 8, further comprising reconfiguring the predefined time interval, based on handover performance associated with handover of the at least one UE.

10. The method of claim 1, wherein the retention factor for each of the plurality of configured NBSs and each of the at least one new NBS is computed based on at least an associated signal level time gradient, inactivity time, traffic load, interference level, and handover failure rate.

11. A Serving Base Station (SBS) for neighbor relation management in a wireless broadband network, the SBS comprising:
a processor; and
a memory communicatively coupled to the processor, wherein the memory stores processor instructions, which, on execution, causes the processor to:
dynamically select a set of signal measurement reports from a plurality of signal measurement reports received within a predefined time interval based on at least one of: a location of origin of each of the plurality of signal measurement reports, and variation of signal quality of each of the plurality of signal measurement reports with respect to an average signal quality associated with the plurality of signal measurement reports;
sample signal level values of a plurality of configured Neighboring Base Stations (NBSs) and at least one new NBS, from the set of signal measurement reports, for a predefined sampling time period, wherein the signal level values of the at least one new NBS are greater than a predefined threshold for the predefined sampling time period, and wherein the set of signal measurement reports comprises signal measurement reports corresponding to the plurality of configured NBSs and the at least one new NBS; and
compute a retention factor for each of the plurality of configured NBSs and each of the at least one new NBS, in response to sampling the signal level values.

12. The SBS of claim 11, wherein the processor instructions further cause the at least one processor to compute a signal level time gradient for each of the plurality of configured NBSs and each of the at least one new NBS using a regression technique, wherein a signal level time gradient for a NBS is computed based on a signal level value associated with the NBS and a time period for measuring the signal level value.

13. The SBS of claim 11, wherein the processor instructions further cause the at least one processor to rank NBSs within a Neighboring Relation Table (NRT) of the SBS based on retention factors computed for the NBSs, wherein a NBS having the highest retention factor in the NRT is assigned the highest rank and a NBS having the lowest retention factor in the NRT is assigned the lowest rank.

14. The SBS of claim 13, wherein the processor instructions further cause the at least one processor to determine a relative rank for at least one NBS not already present in the NRT, based on the ranking of the NBSs present in the NRT, wherein at least one of the plurality of configured NBSs and the at least one new NBS comprise the at least one NBS.

15. The SBS of claim 14, wherein the processor instructions further cause the at least one processor to temporarily update the NRT by adding the at least one NBS to the NRT based on an associated signal level time gradient being greater than a gradient threshold.

16. The SBS of claim 15, wherein the processor instructions further cause the at least one processor to remove at least one low ranked NBS from the NRT in response to the updating, based on the ranking of the NBSs and a relative rank determined for each of the at least one NBS, when the total number of NBSs in the temporarily updated NRT is greater than a threshold number of BSs.

17. The SBS of claim 11, wherein the processor instructions further cause the at least one processor to perform handover of at least one UE to at least one NBS selected from one of the plurality of configured NBSs or the at least one new NBS, based on an associated retention factor.

18. The SBS of claim 17, wherein the processor instructions further cause the at least one processor to reconfigure the predefined time interval, based on handover performance associated with handover of the at least one UE.

19. The SBS of claim 11, wherein the retention factor for each of the plurality of configured NBSs and each of the at least one new NBS is computed based on at least an associated signal level time gradient, inactivity time, traffic load, interference level, and handover failure rate.

20. A non-transitory computer-readable storage medium having stored thereon, a set of computer-executable instructions for causing a computer comprising one or more processors to perform steps comprising:
dynamically selecting, by a Serving Base Station (SBS), a set of signal measurement reports from a plurality of signal measurement reports received within a predefined time interval based on at least one of: a location of origin of each of the plurality of signal measurement reports, and variation of signal quality of each of the plurality of signal measurement reports with respect to an average signal quality associated with the plurality of signal measurement reports;
sampling, by the SBS, signal level values of a plurality of configured Neighboring Base Stations (NBSs) and at least one new NBS, from the set of signal measurement reports, for a predefined sampling time period, wherein the signal level values of the at least one new NBS are greater than a predefined threshold for the predefined sampling time period, and wherein the set of signal measurement reports comprises signal measurement reports corresponding to the plurality of configured NBSs and the at least one new NBS; and
computing, by the SBS, a retention factor for each of the plurality of configured NBSs and each of the at least one new NBS, in response to sampling the signal level values.

* * * * *